United States Patent
Mazoki et al.

(10) Patent No.: US 7,042,413 B2
(45) Date of Patent: May 9, 2006

(54) SECURITY TAG WITH THREE DIMENSIONAL ANTENNA ARRAY MADE FROM FLAT STOCK

(75) Inventors: Gary T. Mazoki, Sewell, NJ (US); Anthony F. Piccoli, Audubon, NJ (US); Thomas J. Clare, Media, PA (US); Eric Eckstein, Merion Station, PA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 0 days.

(21) Appl. No.: 10/914,432

(22) Filed: Aug. 9, 2004

(65) Prior Publication Data

US 2005/0040994 A1 Feb. 24, 2005

Related U.S. Application Data

(60) Provisional application No. 60/497,099, filed on Aug. 22, 2003.

(51) Int. Cl.
*H01Q 9/28* (2006.01)
(52) U.S. Cl. ....................... 343/795; 343/809
(58) Field of Classification Search ................ 343/795, 343/809; 340/572.7
See application file for complete search history.

(56) References Cited

U.S. PATENT DOCUMENTS

| | | | |
|---|---|---|---|
| 3,478,363 A * | 11/1969 | Wells ...................... | 343/802 |
| 4,446,465 A | 5/1984 | Donovan | |
| 4,782,345 A | 11/1988 | Landt | |
| 4,816,839 A | 3/1989 | Landt | |
| 4,853,705 A | 8/1989 | Landt | |
| 5,056,111 A | 10/1991 | Duling, III et al. | |
| 5,173,715 A * | 12/1992 | Rodal et al. ............. | 343/795 |
| 5,187,449 A | 2/1993 | May | |
| 5,440,315 A | 8/1995 | Wright et al. | |
| 5,448,110 A * | 9/1995 | Tuttle et al. ............. | 257/723 |
| 5,572,226 A | 11/1996 | Tuttle | |
| 5,592,185 A | 1/1997 | Itabashi et al. | |
| 5,610,595 A | 3/1997 | Garrabrant et al. | |
| 5,623,271 A | 4/1997 | Ponnapalli | |
| 5,719,586 A * | 2/1998 | Tuttle ...................... | 343/726 |
| 5,771,021 A | 6/1998 | Veghte et al. | |
| 5,821,859 A | 10/1998 | Schrott et al. | |
| 5,825,329 A | 10/1998 | Veghte et al. | |
| 5,972,156 A | 10/1999 | Brady et al. | |
| 6,028,564 A | 2/2000 | Duan et al. | |
| 6,078,259 A | 6/2000 | Brady et al. | |
| 6,097,347 A | 8/2000 | Duan et al. | |
| 6,140,146 A | 10/2000 | Brady et al. | |
| 6,215,402 B1 | 4/2001 | Rao Kodukula et al. | |
| 6,229,408 B1 | 5/2001 | Jovanovich et al. | |
| 6,249,227 B1 | 6/2001 | Brady et al. | |

(Continued)

FOREIGN PATENT DOCUMENTS

EP 1 115 176 7/2001

OTHER PUBLICATIONS

International Search Report dated Nov. 22, 2004 for corresponding PCT/US2004/026053.

*Primary Examiner*—Tho Phan
(74) *Attorney, Agent, or Firm*—Caesar, Rivise, Bernstein, Cohen & Pokotilow, Ltd.

(57) ABSTRACT

A three-dimensional dipole antenna system for an RFID tag that optimizes detection for a given available volume in which to situate the RFID tag.

20 Claims, 3 Drawing Sheets

U.S. PATENT DOCUMENTS

| | | |
|---|---|---|
| 6,249,260 B1 * | 6/2001 | Holloway ............... 343/795 |
| 6,278,413 B1 | 8/2001 | Hugh et al. |
| 6,320,509 B1 | 11/2001 | Brady et al. |
| 6,441,740 B1 | 8/2002 | Brady et al. |
| 6,535,108 B1 | 3/2003 | Schrott et al. |
| 6,535,175 B1 | 3/2003 | Brady et al. |
| 6,549,064 B1 | 4/2003 | Bandy et al. |
| 6,734,797 B1 | 5/2004 | Shanks et al. |
| 6,864,852 B1 * | 3/2005 | Chiang et al. ............ 343/817 |
| 2002/0060647 A1 | 5/2002 | Masuda et al. |
| 2002/0080083 A1 | 6/2002 | Nantz et al. |
| 2002/0149480 A1 | 10/2002 | Shanks et al. |
| 2002/0149481 A1 | 10/2002 | Shanks et al. |
| 2002/0149482 A1 | 10/2002 | Shanks et al. |
| 2002/0149483 A1 | 10/2002 | Shanks et al. |
| 2002/0152044 A1 | 10/2002 | Shanks et al. |
| 2002/0167405 A1 | 11/2002 | Shanks et al. |
| 2003/0137400 A1 | 7/2003 | Heinrich et al. |
| 2003/0146783 A1 | 8/2003 | Bandy et al. |
| 2003/0214389 A1 | 11/2003 | Arneson et al. |
| 2003/0222763 A1 | 12/2003 | Pillai et al. |
| 2004/0020036 A1 | 2/2004 | Arneson et al. |
| 2004/0020037 A1 | 2/2004 | Arneson et al. |
| 2004/0020038 A1 | 2/2004 | Arneson et al. |
| 2004/0020039 A1 | 2/2004 | Arneson et al. |
| 2004/0020040 A1 | 2/2004 | Arneson et al. |
| 2004/0036576 A1 | 2/2004 | Friedman |
| 2004/0111338 A1 | 6/2004 | Bandy et al. |
| 2005/0007294 A1 * | 1/2005 | Handelsman ............ 343/867 |

* cited by examiner

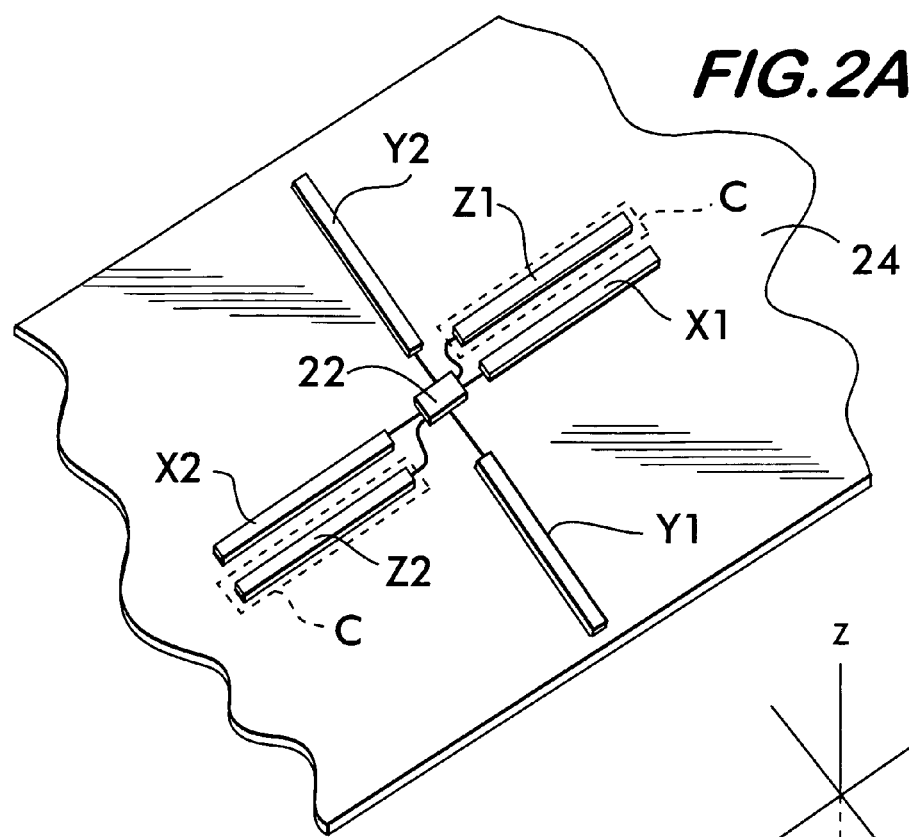
*FIG.2A*
*FIG.2C*
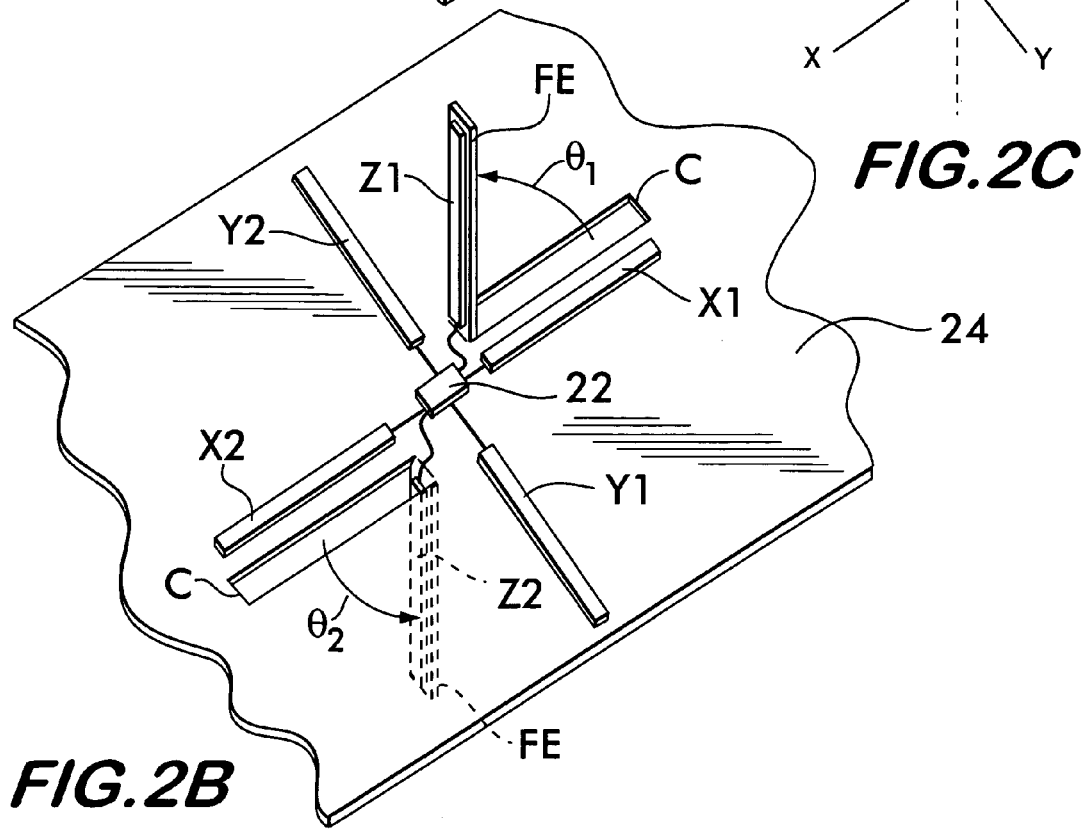
*FIG.2B*

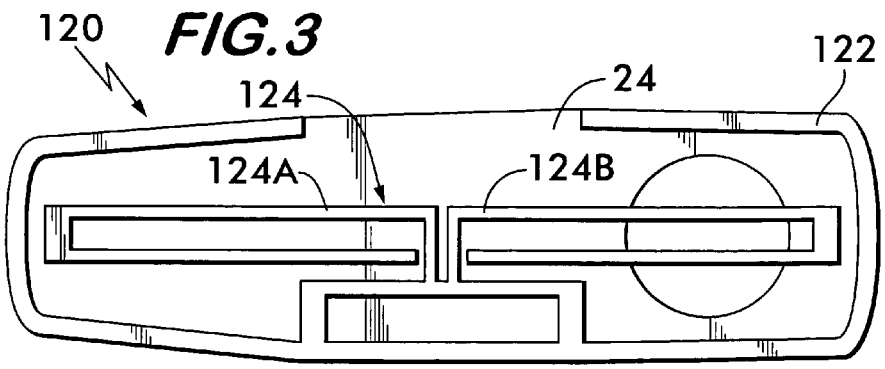
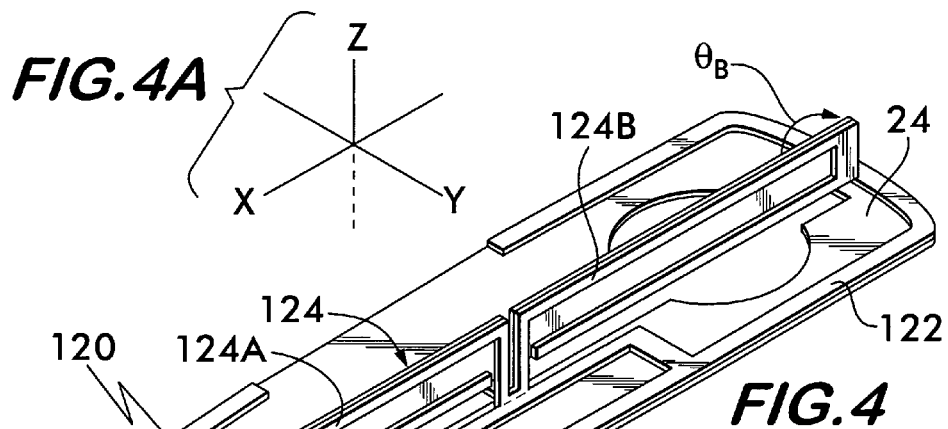
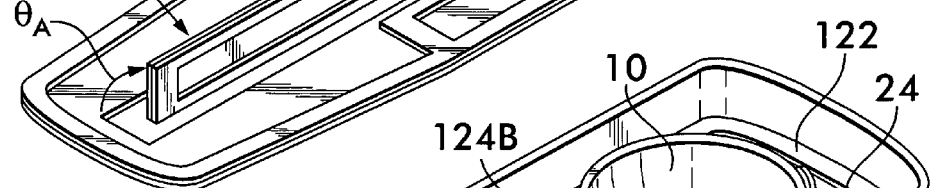
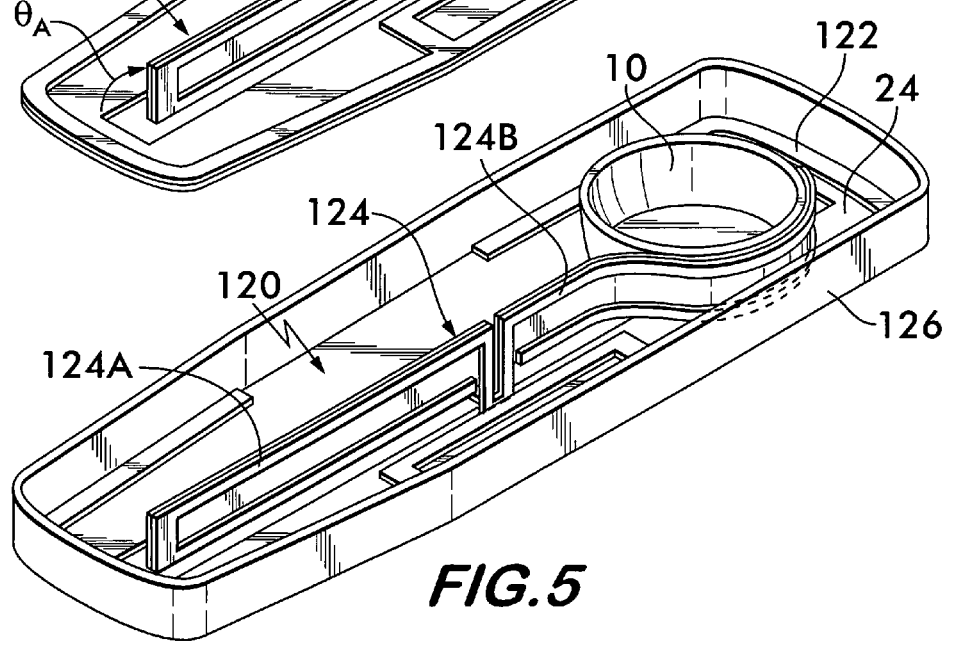

SECURITY TAG WITH THREE DIMENSIONAL ANTENNA ARRAY MADE FROM FLAT STOCK

CROSS-REFERENCE TO RELATED APPLICATIONS

This application claims the benefit under § 119(e) of U.S. Provisional Application Ser. No. 60/497,099 filed on Aug. 22, 2003 entitled SECURITY TAG WITH THREE DIMENSIONAL ANTENNA ARRAY MADE FROM FLAT STOCK and whose entire disclosed is incorporated by reference herein.

BACKGROUND OF THE INVENTION

1. Field of Invention

This invention relates to security tags and, more particularly, to an ultra-high frequency (UHF) dipole antenna system for a radio frequency identification (RFID) tag that optimizes detection for a given available volume in which to situate the RFID tag.

2. Description of Related Art

Low cost tags manufactured by continuous feed processes are normally formed from tag stock and are therefore two-dimensional. The performance of two-dimensional tags is generally a strong function of the orientation of the tag's antenna relative to the antenna of the tag interrogator and reader.

One approach used for reducing the sensitivity of tags to their orientation with respect to the interrogator/reader include increasing the effective area of the tag antenna so that greater energy is extracted from the incident electromagnetic field. Another approach, used with dipole antennas, is to orient two or more antennas at angles to each other within the plane of the tag stock. However, both of the aforementioned approaches results in a larger tag, adding manufacturing expense and reducing marketability.

To accommodate the use of two dipole antennae in RFID tags, one company, Matrics, Inc. of Rockville, Md., has developed an RFID system IC (e.g., on Matrics Tag X1020) that provides for a plurality of RF inputs along with a ground terminal.

However, especially where UHF frequencies (e.g., 850 MHz–950 MHz) and microwave frequencies (e.g., 2.3 Ghz–2.6 Ghz) are used in communicating with RFID tags, there remains a need for a UHF(or microwave) dipole antenna system that optimizes detection for a given volume in which the RFID tag is positioned.

All references cited herein are incorporated herein by reference in their entireties.

BRIEF SUMMARY OF THE INVENTION

An antenna configuration for use in a security tag (e.g., an RFID security tag) that optimizes the receipt of a signal issued from an interrogator or reader. The antenna configuration comprises: a first dipole and a second dipole arranged in a non-parallel nor collinear configuration to form a plane (e.g., a web material) comprising the first and second dipoles; and a third dipole being positioned out of the plane.

A method of fabricating a three-dimensional antenna for a security tag (e.g., an RFID security tag) for optimizing the receipt of a signal issued from an interrogator or reader. The method comprises the steps of: (a) providing a web material (e.g., substrate, flat stock, paper, plastic, etc.); (b) forming a first dipole and a second dipole on the web material and wherein the first dipole and the second dipole are formed to be non-parallel nor collinear with respect to each other; (c) forming a third dipole on the web material; (d) cutting the web material to free a portion of the third dipole from the web material; and (e) displacing the free portion out of the web material.

BRIEF DESCRIPTION OF SEVERAL VIEWS OF THE DRAWINGS

The invention will be described in conjunction with the following drawings in which like reference numerals designate like elements and wherein:

FIG. 2A depicts a part of a substrate containing the RFID integrated circuit and the antenna stubs for the three-dimensional antenna as part of the substrate during manufacture of the tag;

FIG. 2B shows how two of the antenna stubs are lifted out of the substrate to form the dipole antenna is the third (z) axis;

FIG. 2C are reference Cartesian coordinate axes;

FIG. 3 is a plan view diagram of tag stock with multiple elements laid out in two-dimensions;

FIG. 4 is an isometric view diagram of a tag inlay with antenna elements folded so as to be in three-dimensions;

FIG. 4A are reference Cartesian coordinate axes for the second embodiment; and

FIG. 5 is an isometric view diagram of a folded tag installed in a back shell of a hard tag housing.

DETAILED DESCRIPTION OF THE INVENTION

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Figure 1:
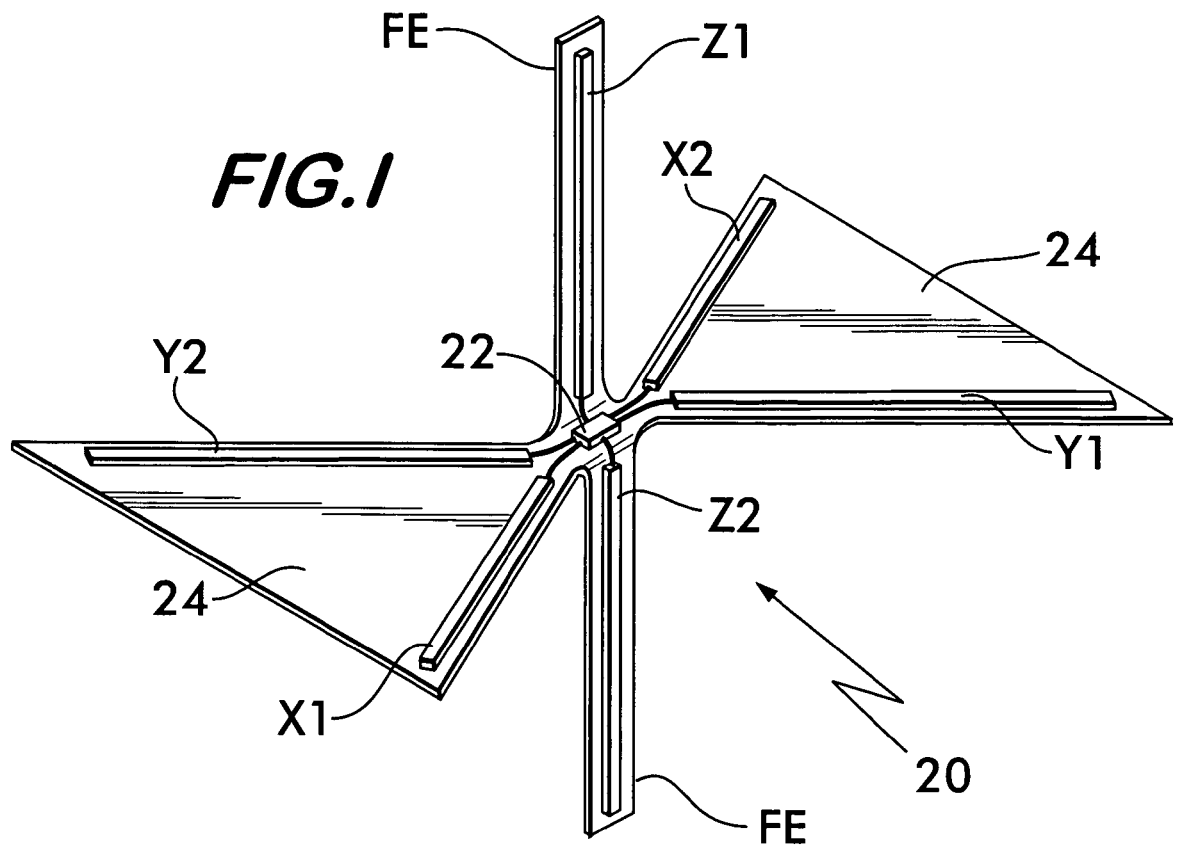
FIG. 1 is a functional diagram of the security tag with three-dimensional antenna.
Figure 1A:
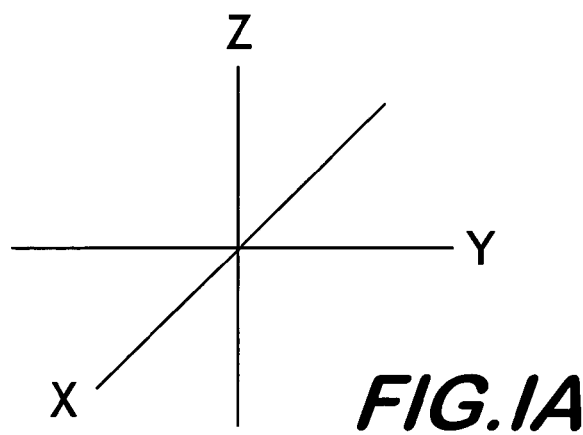
FIG. 1A are reference Cartesian coordinate axes.

There is shown at 20 in FIG. 1 an RFID security tag comprising a three-dimensional antenna. The RFID security tag 20 comprises three dipole antennae coupled to an RFID integrated circuit (IC) 22. A dipole antenna in the x-axis (see FIG. 1A for axes orientation) comprises antenna stubs X1 and X2. A dipole antenna in the y-axis comprises antenna stubs Y1 and Y2. Finally, a third dipole antenna in the z-axis comprises antenna stubs Z1 and Z2. This RFID security tag 20 can be packaged in an enclosure, e.g., a ball-shaped enclosure, a cubic box-shaped enclosure, etc. The RFID security tag 20 is ideal for placement in shipping pallets, for example, or incorporation into packing or packaging materials. The presence of a dipole in all three dimensions optimizes detection, by the RFID tag 20, of a signal issued from an interrogator or reader (not shown) for a given volume in which the tag 20 is present, especially for signals in the UHF frequency range (e.g., 850 MHz–950 MHz) and in the microwave range (e.g., 2.3 Ghz–2.6 Ghz). Thus, the three-dimensional antenna forms an improvement over a two-dimensional antenna and operates better than a straight or wavy single dipole antenna.

A very economical method to produce the z-axis dipole is to use security tag flat stock processes for creating all of the dipoles. In particular, as shown in FIGS. 2A–2B, all three dipoles are fabricated on a flat sheet of web material (FIG. 2A) and electrically coupled to the RFID IC 22. At a subsequent stage, the web material connecting one of the dipoles is cut (see lines C in FIG. 2A), allowing the free end (FE) of each dipole stub to be folded out of the x-y plane (FIG. 2B) and perpendicular to the other two dipoles (see FIG. 2C for axes orientation).

The dipole antennae of the RFID tag 20 of the present invention can be produced using conventional processes using etching, printing (e.g., copper or silver inks, flexographic printing), die cutting, laser cutting, etc. The web material 24 may comprise any flat stock or substrate including paper or plastic, etc. In the preferred embodiment, the thickness of the web material 24 could be in the range of 25 to 90 microns; the antenna stubs X1-Z2 or elements 122/124 (see FIGS. 3–5 and corresponding text), e.g., metal trace, could be in the range of 7 to 60 microns or more. However, it is known to those skilled in the art that the thickness of the web material 24 and the antenna stubs X1-Z2/elements 122/124 are not restricted in any way to those ranges and those ranges do not limit the scope of the invention in any way. In fact, it is within the broadest scope of the present invention to include antenna stubs/elements that are embedded in the web material 24, including where the antenna stubs/elements are flush with the surface of the web material 24. The RFID IC 22 can be electrically coupled to the antenna stubs using wire bonding, flip chip processes, contact cementing, etc. Coupling the stubs/elements to the RFID IC 22 can be accomplished using rectifiers and even multiplexers to provide the signals received from the various dipoles to the RFID IC 22. Thus, it is within the broadest scope of the present invention to include any process whereby the stubs of all of the dipoles are formed on or in the substrate and then electrically coupled to the RFID IC 22. Moreover, it is also within the broadest scope of the present invention to include the security tag manufacturing processes disclosed in U.S. Patent Application Ser. No. 60/547,235 entitled Security Tags, Apparatus and Methods for Making the Same, filed on Feb. 23, 2004 or disclosed in U.S. patent application Ser. No. 10/235,733 entitled Security Tag and Process for Making the Same, filed Sep. 5, 2002, both of whose entire disclosures are incorporated by reference herein and both of which are owned by the same Assignee, namely Checkpoint Systems, Inc., as the present application. The antenna stubs (X1-Z2) may include tuning stubs that can be trimmed and holding bars for impedance matching that can be modified to properly tune (e.g., in-line tuning of the dipoles while they reside on/in the substrate) the three dipoles before the z-axis stubs Z1 and Z2 are lifted out of the x-y plane.

It should be understood that although the preferred embodiment includes a third dipole (stubs Z1/Z2) that is orthogonally oriented with respect to said first and second dipoles, it is within the broadest scope of the present invention to include a third dipole having stubs that are positioned out of the x-y plane formed by the first and second dipoles but are not necessarily orthogonal to that plane. Thus, the angles $\theta_1$ and $\theta_2$ shown in FIG. 2B may be between 0° and 90° with respect to a horizontal reference line in the x-y plane. Moreover, it is also within the broadest scope of the invention wherein the angles $\theta_1$ and $\theta_2$ are not equal.

Referring to FIG. 3, there is shown (i.e., a plan view) another embodiment 120 of a two-dimensional antenna array having multiple dipole elements formed on tag stock 24 for use with electronic article surveillance (EAS) and RFID type tags. In particular, two folded dipole elements are shown in this embodiment 120, an outer element 122 around the perimeter of the cut tag stock 24 and an inner element 124 within the area of the outer element 122 (the RFID IC 22 is not shown). The inner element 124 comprises dipole stubs 124A and 124B. Preferably, the inner 124 and outer elements 122 are formed on the non-conductive tag stock substrate 24 by any of several tag manufacturing process (all of which were previously described above for the tag 20 and all of which are applicable to embodiment 120) that result in an electrically conductive trace which form the antenna stubs. Such processes include, but are limited to, die cutting, conductive ink printing, etching of a conductive foil and additive plating. The substrate is preferably a polymeric material but could be another substantially non-conductive material such as paper.

Referring to FIG. 4, the embodiment 120 of FIG. 3 is shown folded into a three-dimensional antenna array. The three-dimensional antenna array is formed from the two-dimensional antenna array by cutting the substrate 24 (which is in the x-y plane; see FIG. 4A) around the periphery of the inner element 124 using die cutting or a similar process, and folding the inner element 122 into an upright position, the plan of which is at an angle to the x-y plane of the outer element 122. FIG. 5 shows the inner element 124 of the antenna of FIG. 4 at a substantially perpendicular angle with respect to the outer element 122, installed within the back shell 126 of a hard tag (e.g., a reusable security tag) housing, including a portion of a lock housing 10. Unlike the preferred embodiment 20, the second embodiment 120 is formed by having both dipole stubs 124A and 124B on the same side of the flat stock 24.

It should be noted that although the inner element 124 of the second embodiment 120 is orthogonally oriented with respect to the outer element 122, it is within the broadest scope of the present invention to include an inner element 124 having stubs 124A/124B that are positioned out of the x-y plane formed by the outer element 122 but are not necessarily orthogonal to that plane. Thus, the angles $\theta_A$ and $\theta_B$ shown in FIG. 4 may be between 0° and 90° with respect to a horizontal reference line in the x-y plane. Moreover, it is also within the broadest scope of the invention wherein the angles $\theta_A$ and $\theta_B$ are not equal.

The three-dimensional antenna array as shown in FIGS. 1–5 is not limited to the specific implementation of the depicted embodiments. For example, the inner 124 and outer 122 elements need not be folded dipoles but could be other antenna configurations such as loops, and the array could be a combination of various antenna element configurations such as loops and dipoles. Further, the elements of the two-dimensional antenna need not be formed within each other but could be adjacent to each other. Also, the number of elements may be more than two and the elements may be oriented at arbitrary angles with respect to each other and still be within the spirit of the invention.

As would be clear to those skilled in the art, by extending the antenna array into a third dimension, the performance of the antenna array is improved relative to the size of the tag stock consumed to form the antenna array. By maintaining the same area as a two-dimensional antenna array, the performance of the antenna array is increased without increasing the cost of the tag. Alternatively, the antenna area may be reduced to achieve the same performance as a two-dimensional antenna array but in a less expensive tag.

While the invention has been described in detail and with reference to specific examples thereof, it will be apparent to one skilled in the art that various changes and modifications can be made therein without departing from the spirit and scope thereof.

What is claimed is:

1. An antenna configuration for use in a security tag that optimizes a receipt of a signal issued from an interrogator or reader, said antenna configuration comprising:
   a first dipole and a second dipole arranged in a non-parallel nor collinear configuration to form a plane comprising said first and second dipoles; and
   a third dipole being positioned out of said plane and wherein said third dipole comprises a first antenna stub and a second antenna stub and wherein said plane comprises a first side and a second side and wherein said first and second sides are opposite each other, said first antenna stub being positioned out of said plane on said first side and said second antenna stub being positioned out of said plane on said second side.

2. The antenna configuration of claim 1 wherein said first antenna stub and said second antenna stub are positioned orthogonally to said first and second sides, respectively.

3. The antenna configuration of claim 2 wherein said first, second and third dipoles are tuned to RF frequencies.

4. The antenna configuration of claim 3 wherein said RF frequencies are UHF frequencies in a frequency band of approximately 850 MHz–950 MHz.

5. The antenna configuration of claim 3 wherein said RF frequencies are microwave frequencies in a frequency band of approximately 2.3 Ghz–2.6 GHz.

6. An antenna configuration for use in a security tag that optimizes a receipt of a signal issued from an interrogator or reader, said antenna configuration comprising:
   a first dipole and a second dipole arranged in a non-parallel nor collinear configuration to form a plane comprising said first and second dipoles; and
   a third dipole being position out of said plane and wherein said first, second and third dipoles are formed as part of a web material and wherein said plane comprises said web material, said first and second dipoles being part of said web material and wherein said third dipole projects away from said web material.

7. The antenna configuration of claim 6 wherein said third dipole comprises a first antenna stub and a second antenna stub and wherein said web material comprises a first side and a second side and wherein said first and second sides are opposite each other, said first antenna stub being positioned out of said web material on said first side and said second antenna stub being positioned out of said web material on said second side.

8. The antenna configuration of claim 7 wherein said first antenna stub and said second antenna stab are positioned orthogonally to said first and second sides, respectively.

9. The antenna configuration of claim 8 wherein said first, second and third dipoles are tuned to RF frequencies.

10. The antenna configuration of claim 9 wherein said RF frequencies are UHF frequencies in a frequency band of approximately 850 MHz–950 MHz.

11. The antenna configuration of claim 9 wherein said RF frequencies are microwave frequencies in a frequency band of approximately 2.3 Ghz–2.6 GHz.

12. The antenna configuration of claim 7 wherein said first, second and third dipoles are tuned to RF frequencies.

13. The antenna configuration of claim 12 wherein said RF frequencies are UHF frequencies in a frequency band of approximately 850 MHz–950 MHz.

14. The antenna configuration of claim 12 wherein said RF frequencies are microwave frequencies in a frequency band of approximately 2.3 Ghz–2.6 GHz.

15. A method of fabricating a three-dimensional antenna for a security tag for optimizing a receipt of a signal issued from an interrogator or reader, said method comprising the steps of:
   (a) providing a web material;
   (b) forming a first dipole and a second dipole on said web material, said first dipole and said second dipole formed to be non-parallel nor collinear with respect to each other;
   (c) forming a third dipole on said web material;
   (d) cutting said web material to free a portion of said third dipole from said web material; and
   (e) displacing said free portion out of said web material.

16. The method of claim 15 wherein said step of forming said third dipole on said web material comprises creating a first antenna stub and a second antenna stub and wherein said step of cutting said material comprises cutting said web material to free a first portion of said first antenna stub and to free a second portion of said second antenna stub.

17. The method of claim 16 wherein said web material has a first side and a second side, said first and second sides being opposite each other, and wherein said step of displacing said free portion out of said web material comprises displacing said first and second portions away from said first side or away from said second side.

18. The method of claim 17 wherein said step of displacing said first and second portions away from said first side or away from said second side comprises displacing said first and second portions orthogonally away from said first side or from said second side.

19. The method of claim 16 wherein said web material has a first side and a second side, said first and second sides being opposite each other, and wherein said step of displacing said free portion out of said web material comprises displacing said first portion away from said first side and said second portion away from said second side.

20. The method of claim 19 wherein said step of displacing said first portion away from said first side and said second portion away from said second side comprises displacing said first and second portions orthogonally away from said first and second sides, respectively.

* * * * *